US012719775B2

(12) United States Patent
Ananthanarayanan et al.

(10) Patent No.: US 12,719,775 B2
(45) Date of Patent: Aug. 25, 2026

(54) TROUBLESHOOTING ASSISTANT FOR MOBILE NETWORK OPERATORS

(71) Applicant: MICROSOFT TECHNOLOGY LICENSING, LLC, Redmond, WA (US)

(72) Inventors: Ganesh Ananthanarayanan, Sammamish, WA (US); Jason Hogg, Kirkland, WA (US); Mustafa Kasap, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 285 days.

(21) Appl. No.: 18/668,033

(22) Filed: May 17, 2024

(65) Prior Publication Data

US 2025/0274367 A1 Aug. 28, 2025

Related U.S. Application Data

(60) Provisional application No. 63/557,358, filed on Feb. 23, 2024.

(51) Int. Cl.
*H04L 43/0823* (2022.01)
*H04L 43/04* (2022.01)

(52) U.S. Cl.
CPC .......... *H04L 43/0823* (2013.01); *H04L 43/04* (2013.01)

(58) Field of Classification Search
None
See application file for complete search history.

(56) References Cited

U.S. PATENT DOCUMENTS

| | | | | |
|---|---|---|---|---|
| 11,477,091 | B1 * | 10/2022 | Saluja | H04L 41/142 |
| 11,968,098 | B1 * | 4/2024 | Ranjan | H04L 41/5009 |
| 2017/0094537 | A1 * | 3/2017 | Yang | H04L 41/0631 |
| 2024/0195700 | A1 * | 6/2024 | Bashbaghi | H04L 41/142 |
| 2024/0406744 | A1 * | 12/2024 | Montalvo | H04B 17/27 |

* cited by examiner

*Primary Examiner* — Nguyen H Ngo
(74) *Attorney, Agent, or Firm* — Han Gim; Newport IP, LLC

(57) ABSTRACT

Conditions are identified in a telecommunications network. Data is collected that comprises live data indicative of conditions in the telecommunications network. Skills are configured to monitor key performance indicators (KPIs) and detect anomalies in the telecommunications network and localizations of the anomalies based on the KPIs. Based on metadata indicative of the KPIs and the localization, a data store is searched to identify associated incident reports and documentation related to design and requirements knowledge of the telecommunications network or portions thereof. Based on the skills, identified incident reports, and troubleshooting knowledge base, a prompt is generated for input to a large language model (LLM).

20 Claims, 7 Drawing Sheets

TROUBLESHOOTING ASSISTANT FOR MOBILE NETWORK OPERATORS

PRIORITY APPLICATION

This application claims the benefit of and priority to U.S. Provisional Application No. 63/557,358, filed Feb. 23, 2024, the entire contents of which are incorporated herein by reference.

BACKGROUND

A cloud network providing mobile communications services can have thousands or millions of nodes such as servers and other devices running various networking functions. The nodes and networking functions collectively need to operate reliably in order to provide high-performance services. It is therefore important to provide an effective monitoring mechanism to detect anomalies early, take corrective action, and track each node and network function over its lifecycle to maintain network health and avoid downtime. In a cloud-based system (e.g., one or more data centers) that includes thousands or millions of nodes, the inability to maintain node health and serviceability can have consequences such as processing delays and increased costs, which otherwise can lead to revenue loss and customer dissatisfaction.

It is with respect to these considerations and others that the disclosure made herein is presented.

SUMMARY

Methods and systems are disclosed for implementing features for improving the efficiency of mobile network operators. The disclosed methods and systems actively monitor mobile operator networks, gathering insights about the overall health and performance of the network infrastructure. A knowledge base assistant or edge base assistant is implemented that enables a troubleshooting assistant that is configured to identify the root cause of errors and provide remediation recommendations. The edge base assistant employs advanced artificial general intelligence (AGI) techniques to generate technical answers to specific inquiries pertaining to the health of a mobile operator network. The disclosed embodiments are augmented with document modules from the mobile operator domain, enabling the edge base assistant to be a more efficient tool for troubleshooting. The disclosed embodiments utilize materials and documents from a knowledge based that contains troubleshooting guides and other sources to provide more intelligent and accurate responses.

This Summary is not intended to limit the scope of the claimed subject matter. Furthermore, the claimed subject matter is not limited to implementations that solve any or all disadvantages noted in any part of this disclosure.

DESCRIPTION OF DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1:
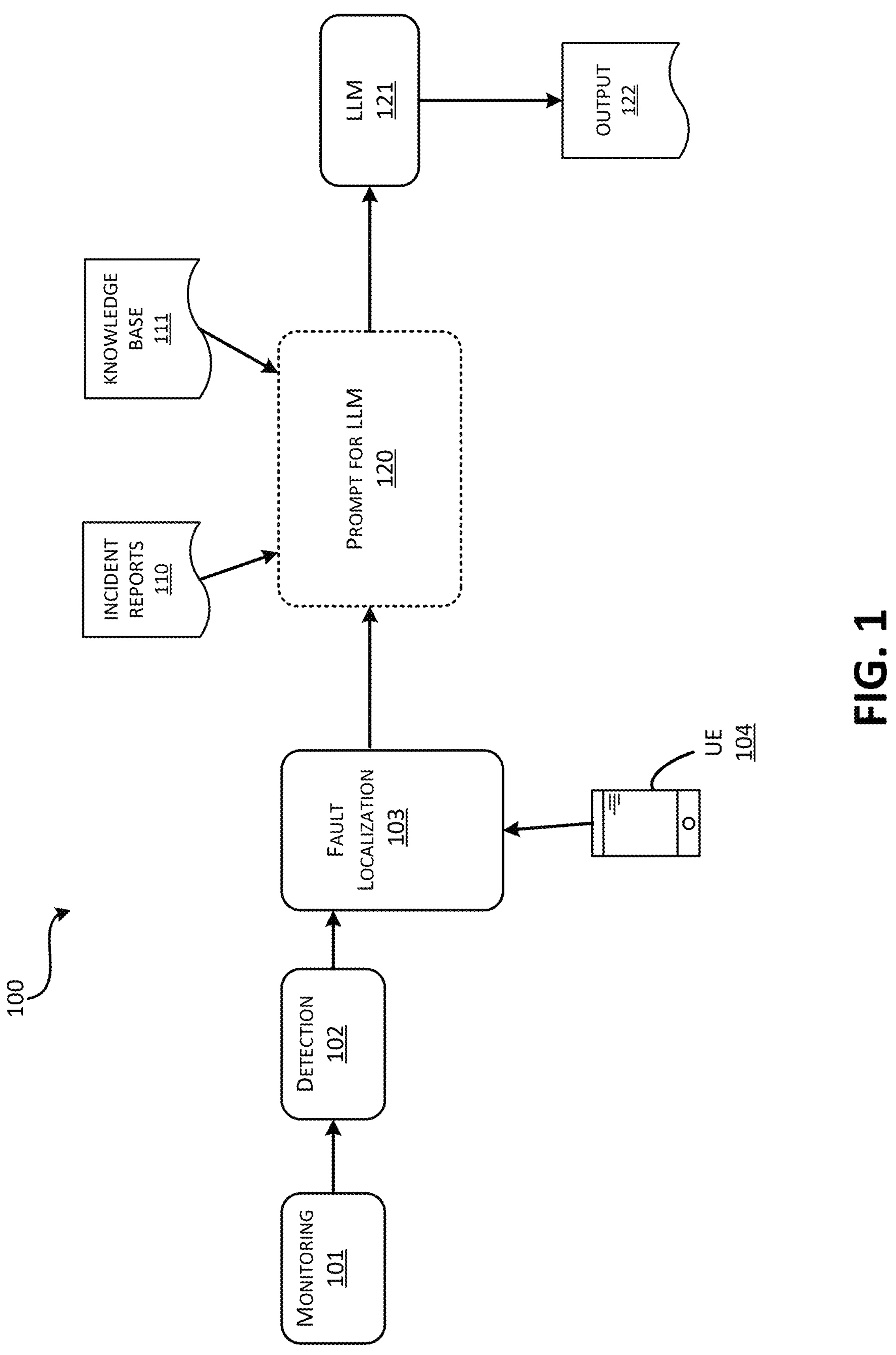
FIG. 1 is a diagram illustrating the disclosed techniques according to one embodiment disclosed herein.

A cloud network providing mobile communications services can have thousands or millions of nodes such as servers and other devices running various networking functions. The nodes and networking functions collectively need to operate reliably in order to provide high-performance services. The inability to maintain node health and serviceability can have consequences such as processing delays, increased costs, and frustrated customers.

The present disclosure describes methods and systems for implementing a knowledge base assistant or edge base assistant that provides a contextually aware service operating within the mobile operator domain (e.g., Microsoft Copilot). The edge base assistant employs advanced artificial general intelligence (AGI) techniques to generate technical answers to specific inquiries pertaining to the health of a mobile operator network. The disclosed embodiments are augmented with document modules from the mobile operator domain, enabling the edge base assistant to be a more efficient tool for troubleshooting. The disclosed embodiments utilize materials and data from a knowledge base that can include documents from troubleshooting guides and other sources to provide more intelligent and accurate responses.

Using the functionality of the knowledge base assistant, a troubleshooting assistant is disclosed that provides dynamic and real-time network monitoring. The troubleshooting assistant is integrated with live data feeds, including cloud data, system logs, and telemetry data. The troubleshooting assistant also interacts with data dashboards from various other data sources.

The troubleshooting assistant operates dynamically and proactively, and detects and responds to alerts in real-time. This real-time data interaction allows for a timely response to potential network issues, significantly reducing the time between issue detection and resolution. This proactive approach allows for efficient management of the health and stability of a mobile operator's network, enabling improved service quality and customer satisfaction.

The disclosed embodiments include combining metrics for input to a large language model (LLM), adding skills into the workflow, and dynamically injecting information into the LLM prompt with data outputs from the skills, data outputs from live data monitoring, inputs from tickets, and portions from documentation.

Referring to the appended drawings, in which like numerals represent like elements throughout the several FIGURES, aspects of various technologies for generating and using prompts will be described. In the following detailed description, references are made to the accompanying drawings that form a part hereof, and which are shown by way of illustration specific configurations or examples.

The disclosed embodiments provide an approach to network monitoring that includes the development of specific features referred to herein as "skills." These skills are tailored to monitor specific network health key performance indicators (KPIs) and identify associated anomalies. Each skill comprises one or more Kusto Query Language (KQL) scripts, which in one embodiment are created by network subject matter experts (SMEs). Skills can include, for example, those tailored to detect certain anomalies or to localize a fault.

In one example, the KQL scripts are executed on database clusters for a service that analyzes network data such as Azure Operator Insights (AOI). The clusters can include detailed network traffic logs, telemetry data, and system logs. For example, a KQL script may query the relevant tables and databases to identify network cells that are degrading, or to find International Mobile Subscriber Identities (IMSIs) that are experiencing network bandwidth issues. It should be noted that KQL is an example language and other languages can be implemented.

In general, the KQL scripts generate summary data comprising tens of rows, as opposed to hundreds or more rows, which could be more costly to analyze by LLMs. The KQL scripts also have the capability to run inline machine learning (ML) algorithms to identify anomalies within a queried dataset. Predefined ML algorithms can also be used, such as those provided by the Azure Data Explorer (ADX) cluster service. The ML algorithms can be used within the KQL scripts to generate simpler and more manageable outputs. For example, these functions can help identify how many anomaly points exist within thousands of filtered rows.

A sample KQL script file content is as follows:

```
```kql
let start_time = datetime(2021-01-01);
let end_time = datetime(2021-12-31);
let target_IMSI = '123456789012345';
datatable(Timestamp: datetime, IMSI: string, NetworkPerformance: real)
[
   datetime(2021-01-01), '123456789012345', 0.95,
   datetime(2021-02-01), '123456789012345', 0.90,
   datetime(2021-03-01), '123456789012345', 0.85,
   // ... more rows ...
]
| where Timestamp between (start_time .. end_time) and IMSI == target_IMSI
| extend (anomalies, score, baseline) = series_decompose_anomalies(NetworkPerformance,
  1.5, -1, 'linefit')
| render anomalychart with(anomalycolumns=anomalies, title='Network Performance over
Time, Anomalies')
```

In addition to the KQL scripts, each skill contains metadata about the skill in YAML format or other suitable format. The metadata can include one or more paragraphs of natural language description of the skill and additional details on how the skill works. A sample metadata file content is as follows:

```
```yaml
SKILL-DETAILS:
  DESCRIPTION: This skill monitors the network performance for specific IMSIs over a
defined time period, identifying any anomalies that may indicate potential issues.
  FREQUENCY: This skill should be executed every 5 minutes.
KQL-SCRIPTS:
  KQLS-TO-RUN: NetworkPerformanceMonitor.kql
  KQL-PARAMETERS: The parameters required for this KQL script include the start and end
dates for the monitoring period, and the target IMSI.
ANALYSIS-CRITERIA:
  ALERT-CRITERIA-1: If the network performance for the target IMSI drops below 0.8 at any
point during the monitoring period, an alert is triggered. The alert includes details of the
potential issue and its possible implications.
PROMPT-DETAILS:
  PROMPT: The MetaPrompt to use when running an LLM with the description and parameters
from this skill.
REFERENCE-MATERIALS:
  REFERENCE-DOCUMENTS: A list of documents and specific sections within those
documents that provide valuable information about this specific skill or incident type. These
documents typically contain troubleshooting guides, mitigation steps, and RCA information.
This field may follow the format: [{network_guide.pdf, section-3},
{troubleshooting_manual.pdf, chapter-5}]
```
```

In addition to KQLs and metadata, skills can also contain a prompt file. Along with the output of KQLs that are executed at each skill execution frequency, information in the metadata is used to replace the placeholders in the prompt file. The constructed final prompt is run over an LLM to generate network insights around this specific skills capability. A sample prompt file is as follows:
```

```txt
// Skill Overview
SKILL DESCRIPTION:
<<YML_DESCRIPTION>>
// KQL Script Execution Results
EXECUTED KQL SCRIPT OUTPUT:
The following is the tabular data in CSV format, representing the results of the executed KQL
script:
<< KQL_RESULT>>
// Evaluation Criteria
EVALUATION CRITERIA:
The following criteria have been identified to provide positive indications about the specific
purpose of this skill:
<<CRITERIA>>
// Problem Analysis
PROBLEM ANALYSIS:
Based on the anomalies identified in the network performance, the potential issues could be
due to <<SOLUTION_DESCRIPTION>>
// Reference Documents
REFERENCE DOCUMENTS:
For further understanding and troubleshooting steps, refer to the following documents:
<<REFERENCES>>
// Grounding Data from Search Results
SEARCH RESULT ANALYSIS:
Based on the search results, the following additional insights were gathered:
<<GROUNDING DATA FROM SEARCH RESULTS>>
// Meta Prompt for LLM
META PROMPT:
As an LLM, your task is to use the information provided to assess the health of the network.
Consider the output of the KQL script execution and use the evaluation criteria to identify any
anomalies. If problems are identified, refer to the 'Problem Analysis' and 'Reference
Documents' sections to understand the possible causes and steps for remediation. Additionally,
use the 'Search Result Analysis' to get further insights into the problem. Your ultimate aim is
to ensure the optimal health and performance of the network.
```

Through the integration of KQL scripts, metadata, and prompts, the skills offer a comprehensive and proactive approach to monitoring the health of a mobile operator's network. Improved network performance and user experience can be facilitated by identifying and responding to potential issues in real time as described herein.

FIG. 1 illustrates an example system 100 illustrating the disclosed embodiments. Monitoring 101 can be provided at the mobile core of, for example, event data records (EDRs) from mobile core network elements, such as for performance indicators for packet retransmission, throughput, latency, etc. Various kinds of anomalies can be detected 102 and alerts generated as disclosed herein. For example, if the latency suddenly increases above a specified threshold, the cause of the anomaly can be determined. Additional augmentation can be performed such as fault localization 103, for example in network segments, which enables narrowing the focus to a cell, site, gateway, or an appropriate level of localization. Additional information can include user complaints that can be associated with the user's device IMSI 104 that may identify an issue. Localization can include focusing on relevant sections for context generation.

Once the issue is localized, retrieval-augmented generation (RAG) can be used to index information and improve accuracy, using for example tickets, incident reports, sections from troubleshooting data from knowledge base 111 such as troubleshooting guides and manuals, and the like. A prompt 120 for a LLM 121 can be generated. The generation of the prompt can include an index search of the incident reports 110 and knowledge base 111 using metadata and key words from monitoring 101 (e.g., EDRs, performance indicators), detected anomalies and generated alerts, fault localization 103, and user complaints associated with IMSI 104. The prompt for example, can include "Fix the issue with drop in {metric} in {location}. The issue likely spans the {network segment}. Use {incident reports} and {manuals} as examples of how the issue was previously resolved. Recommended mitigation steps are provided as an output 122. An example of mitigation steps can be "To fix the issue of a drop in throughput of IMSIs in a cell, check the number of users connected to the cell. If the number is unusually high, check the weights for the cell and the recent configuration changes. Undo recent configuration changes and observe the throughput of IMSIs."

The live monitoring can be of various data streams which can be monitored using KQL as an example but can be any query language and any data product. The scheme of the language provides various fields, which include performance fields and granularities at which the fields should be monitored. For example, an input can include packet retransmission and round-trip time (RTT) at the granularity of an individual cell as well as a complete gateway. Once the input is specified, the query is automatically constructed to monitor these specific KPIs at the desired aggregate levels. Anomaly detection can be performed using various methodologies including a machine learning model.

Figure 2:
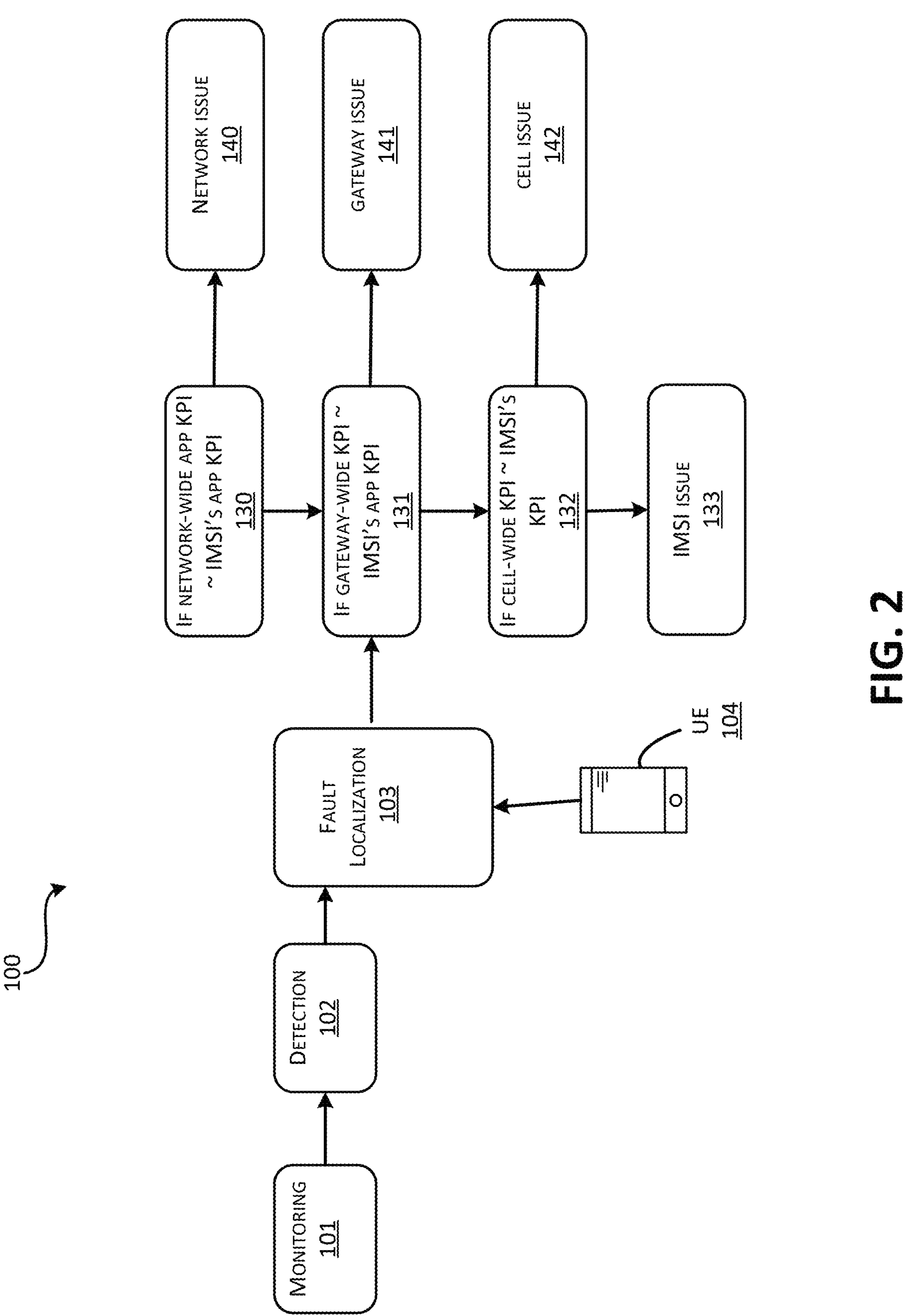
FIG. 2 is a diagram illustrating an example architecture according to one embodiment disclosed herein.

With reference to FIG. 2, in an embodiment, fault localization can be performed using a hierarchical approach. For example, if there is a network-wide issue, the highest level of granularity can initially be used, and the process can proceed downward to different levels of granularity. This can determine, for example, if the issue is network-wide or a gateway issue or a cell level issue and so forth. While the live monitoring can be for networks, the disclosed embodiments can be applied to individual complaints and for a specific user or a specific operator. With reference to FIG. 2, if a network-wide application KPI is similar to the KPI of the IMSI's application 130, then it can be determined that there is a network issue 140. If a gateway-wide application KPI is similar to the KPI of the IMSI's application 131, then it can be determined that there is a gateway issue 141. If a cell-wide KPI is similar to the KPI of the IMSI 133, then it can be determined that there is a call issue 142. Otherwise, it can be determined that there is an issue with the IMSI 131 (the UE).

In an embodiment, the prompt can further include tickets, troubleshooting information such as troubleshooting guides and other manuals. Sections can be created from these sources based on various boundaries. For example, a section boundary can be for an incident report or an individual report. For larger documents such as manuals, the section can be a chapter or other size or portion. Once the source is divided into sections, the sections can be stored in an index or other structure in order to utilize a RAG model. Once stored in the index, metadata can be determined based on keywords for individual KPIs, or index of sections from manuals and so forth.

The prompt is generated dynamically, with not only the metric but specific values and ranges. The prompt can further include descriptive terms that allow the search to be more focused.

Figure 3:
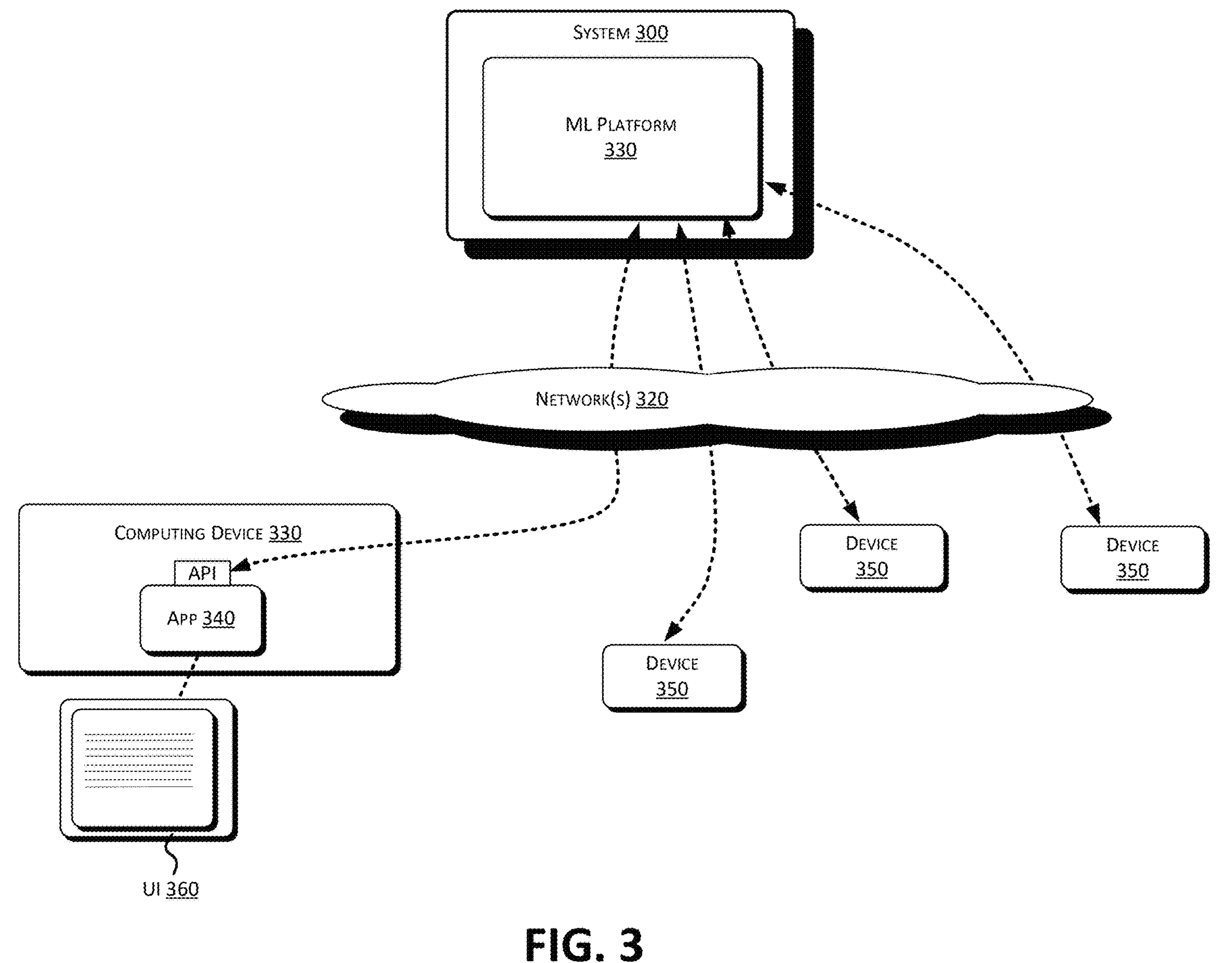
FIG. 3 is a diagram showing aspects of an example system according to one embodiment disclosed herein.

In various embodiments, the machine learning model(s) may be run locally on the client. In other embodiments, the machine learning inferencing can be performed on a server of a network. For example, in the system illustrated in FIG. 3, a system 300 is illustrated that implements ML platform 330. The ML platform 330 may be configured to provide output data to various devices 350 over a network 320, as well as computing device 350. A user interface 360 may be rendered on computing device 350. The user interface 360 may be provided in conjunction with an application 340 that communicates to the ML platform 330 using an API via network 320. In some embodiments, system 300 may be configured to provide issue identification information to users. In one example, ML platform 330 may implement a machine learning system to perform one or more tasks. The ML platform 330 utilizes the machine learning system to perform tasks such as root cause identification. The machine learning system may be configured to be optimized using the techniques described herein.

Figure 4:
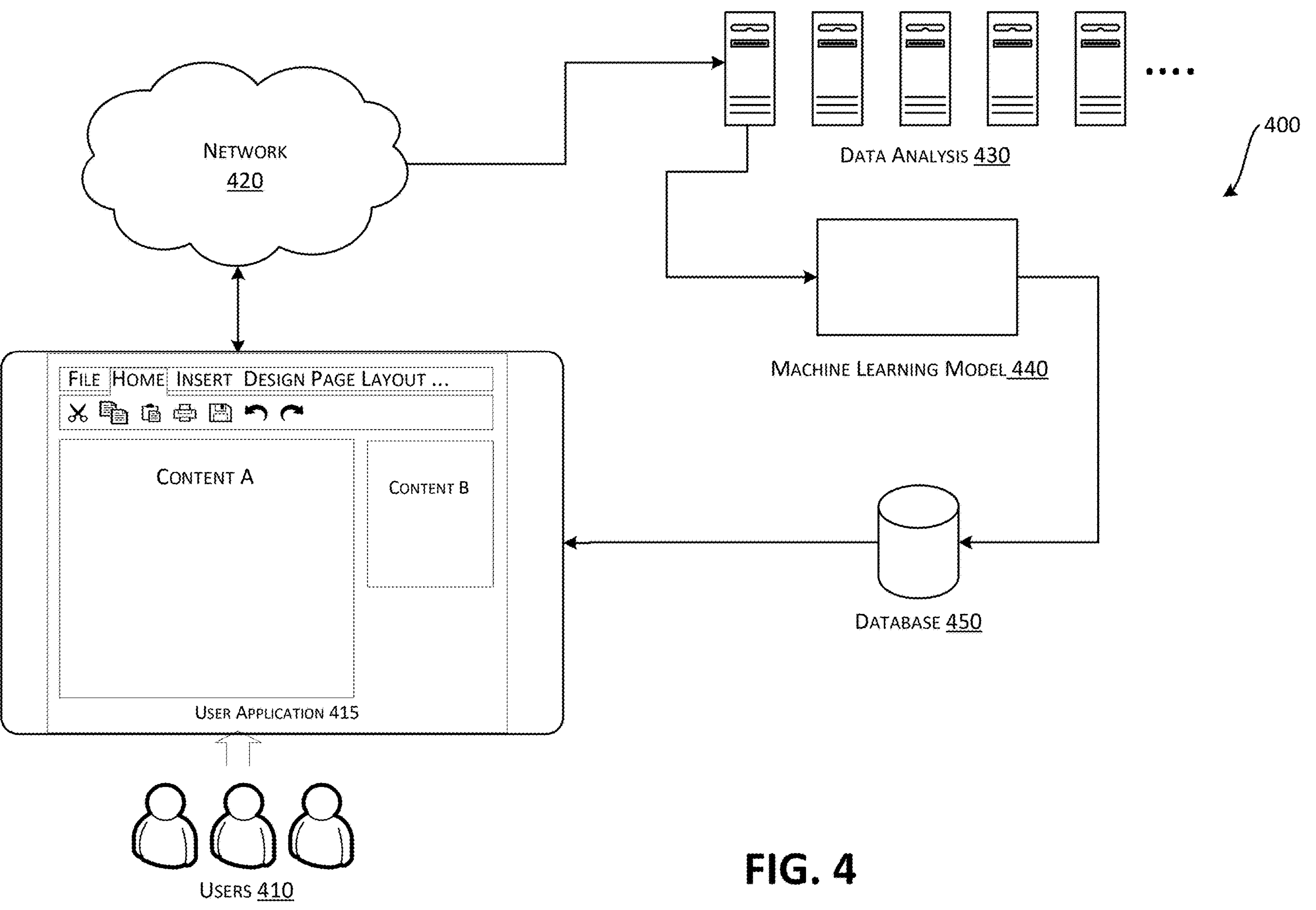
FIG. 4 is a diagram showing aspects of an example system according to one embodiment disclosed herein.

FIG. 4 is a computing system architecture diagram showing an overview of a system disclosed herein for implementing a machine learning model, according to one embodiment disclosed herein. As shown in FIG. 4, a machine learning system 400 may be configured to perform analysis and perform identification, prediction, or other functions based upon various data collected by and processed by data analysis components 430 (which might be referred to individually as an "data analysis component 430" or collectively as the "data analysis components 430"). The data analysis components 430 may, for example, include, but are not limited to, physical computing devices such as server computers or other types of hosts, associated hardware components (e.g., memory and mass storage devices), and networking components (e.g., routers, switches, and cables). The data analysis components 430 can also include software, such as operating systems, applications, and containers, network services, virtual components, such as virtual disks, virtual networks, and virtual machines. Database 450 can include data, such as a database, or a database shard (i.e., a partition of a database). Feedback may be used to further update various parameters that are used by machine learning model 420. Data may be provided to the user application 415 to provide results to various users 410 using a user application 415. In some configurations, machine learning model 440 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 5:
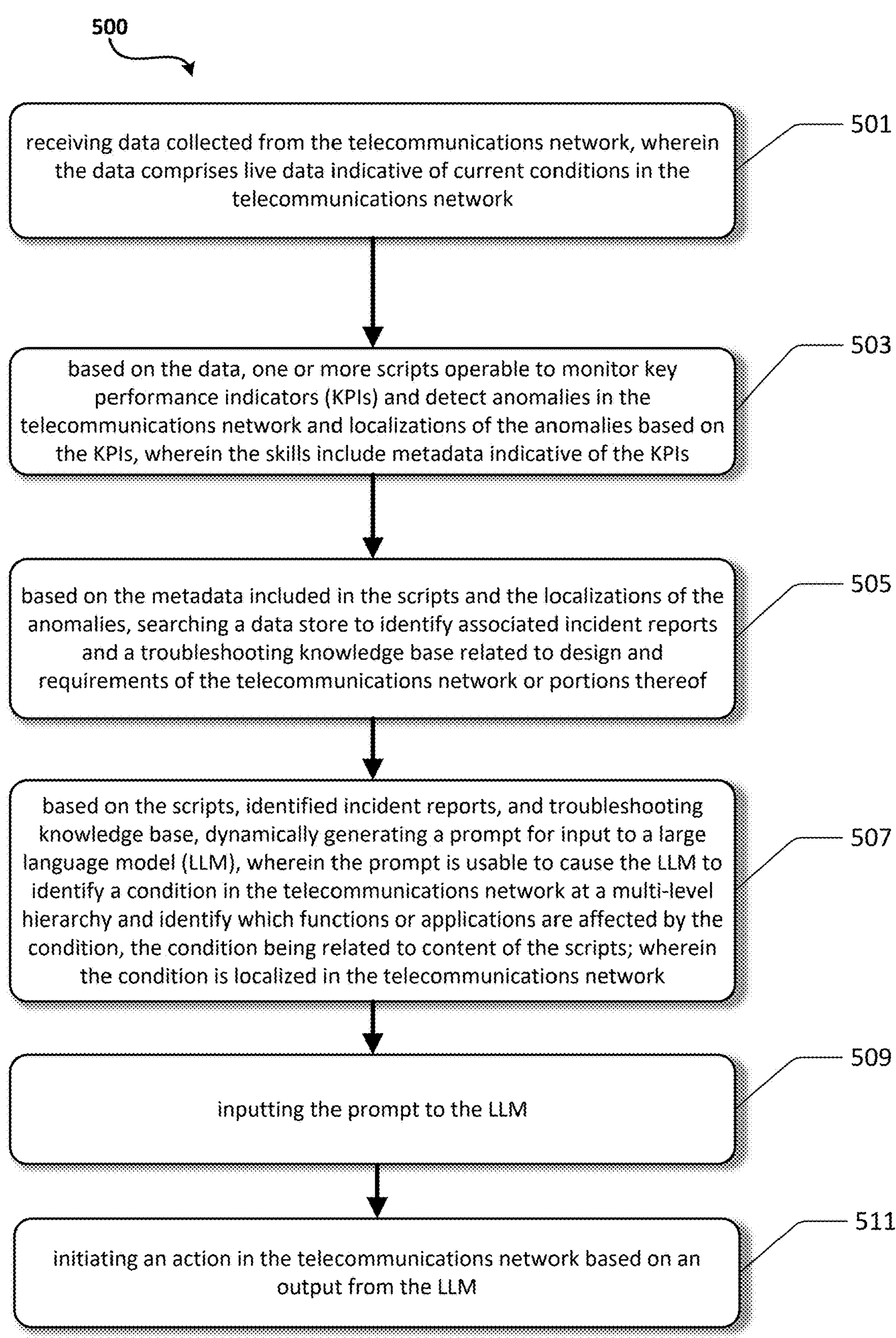
FIG. 5 is a flow diagram showing aspects of an illustrative routine, according to one embodiment disclosed herein.

Turning now to FIG. 5, illustrated is an example operational procedure 500 for identifying conditions in a telecommunications network implemented in a virtualized computing environment in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates receiving, by a computing system, data collected from the telecommunications network. In an embodiment, the data comprises live data indicative of current conditions in the telecommunications network.

Operation 503 illustrates based on the data, accessing, by the computing system, one or more scripts operable to monitor key performance indicators (KPIs) and detect anomalies in the telecommunications network and localizations of the anomalies based on the KPIs. In an embodiment, the skills include metadata indicative of the KPIs.

Operation 505 illustrates based on the metadata included in the scripts and the localizations of the anomalies, searching, by the computing system, a data store to identify associated incident reports and a troubleshooting knowledge base related to design and requirements of the telecommunications network or portions thereof.

Operation 507 illustrates based on the skills, identified incident reports, and troubleshooting knowledge base, dynamically generating a prompt for input to a large language model (LLM). In an embodiment, the prompt is usable to cause the LLM to identify a condition in the telecommunications network at a multi-level hierarchy and identify which functions or applications are affected by the condition, the condition being related to the skills. In an embodiment, the condition is localized in the telecommunications network.

Operation 509 illustrates inputting the prompt to the LLM.

Operation 511 illustrates initiating an action in the telecommunications network based on an output from the LLM.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 6:
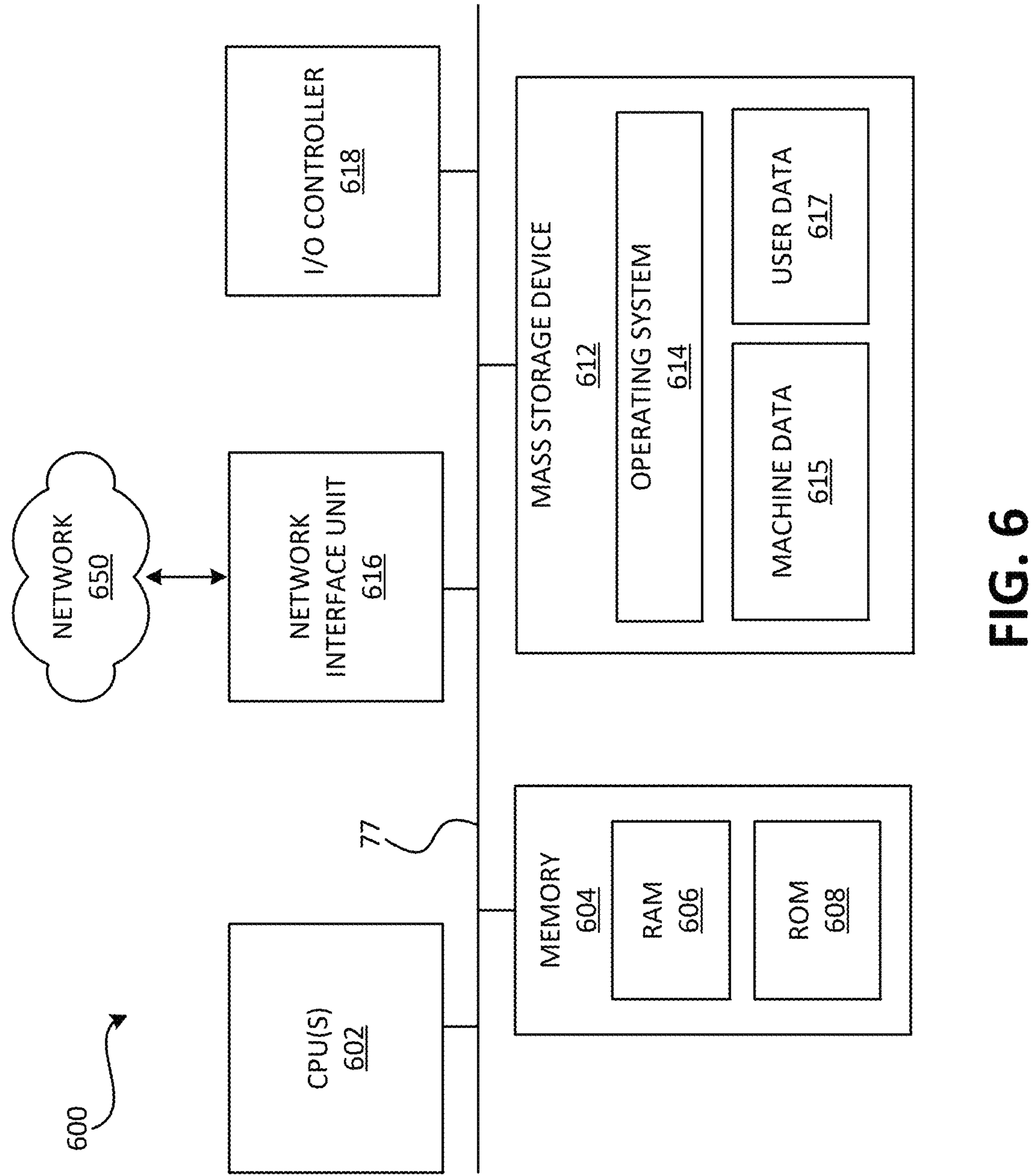
FIG. 6 is a computer architecture diagram illustrating aspects of an example computer architecture for a computer capable of executing the software components described herein.

FIG. 6 shows an example computer architecture for a computer capable of providing the functionality described herein such as, for example, a computing device configured to implement the functionality described above with reference to FIGS. 1-5. Thus, the computer architecture 600 illustrated in FIG. 6 illustrates an architecture for a server computer or another type of computing device suitable for implementing the functionality described herein. The computer architecture 600 might be utilized to execute the various software components presented herein to implement the disclosed technologies.

The computer architecture 600 illustrated in FIG. 6 includes a central processing unit 602 ("CPU"), a system memory 604, including a random-access memory 606 ("RAM") and a read-only memory ("ROM") 608, and a system bus 77 that couples the memory 604 to the CPU 602. A firmware containing basic routines that help to transfer information between elements within the computer architecture 600, such as during startup, is stored in the ROM 608. The computer architecture 600 further includes a mass storage device 612 for storing an operating system 614, other data, such as machine data 615 or user data 617.

The mass storage device 612 is connected to the CPU 602 through a mass storage controller (not shown) connected to the bus 77. The mass storage device 612 and its associated computer-readable media provide non-volatile storage for the computer architecture 600. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various implementations, the computer architecture 600 might operate in a networked environment using logical connections to remote computers through a network 650 and/or another network (not shown). A computing device implementing the computer architecture 600 might connect to the network 650 through a network interface unit 616 connected to the bus 77. It should be appreciated that the network interface unit 616 might also be utilized to connect to other types of networks and remote computer systems.

The computer architecture 600 might also include an input/output controller 618 for receiving and processing input from a number of other devices, including a keyboard, mouse, or electronic stylus (not shown in FIG. 6). Similarly, the input/output controller 618 might provide output to a display screen, a printer, or other type of output device (also not shown in FIG. 6).

It should be appreciated that the software components described herein might, when loaded into the CPU 602 and executed, transform the CPU 602 and the overall computer architecture 600 from a general-purpose computing system into a special-purpose computing system customized to facilitate the functionality presented herein. The CPU 602 might be constructed from any number of transistors or other discrete circuit elements, which might individually or collectively assume any number of states. More specifically, the CPU 602 might operate as a finite-state machine, in response to executable instructions contained within the software modules disclosed herein. These computer-executable instructions might transform the CPU 602 by specifying how the CPU 602 transitions between states, thereby transforming the transistors or other discrete hardware elements constituting the CPU 602.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 might include other types of computing devices, including hand-held computers, embedded computer systems, personal digital assistants, and other types of computing devices known to those skilled in the art.

It is also contemplated that the computer architecture 600 might not include all of the components shown in FIG. 6, might include other components that are not explicitly shown in FIG. 6, or might utilize an architecture completely different than that shown in FIG. 6. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 7:
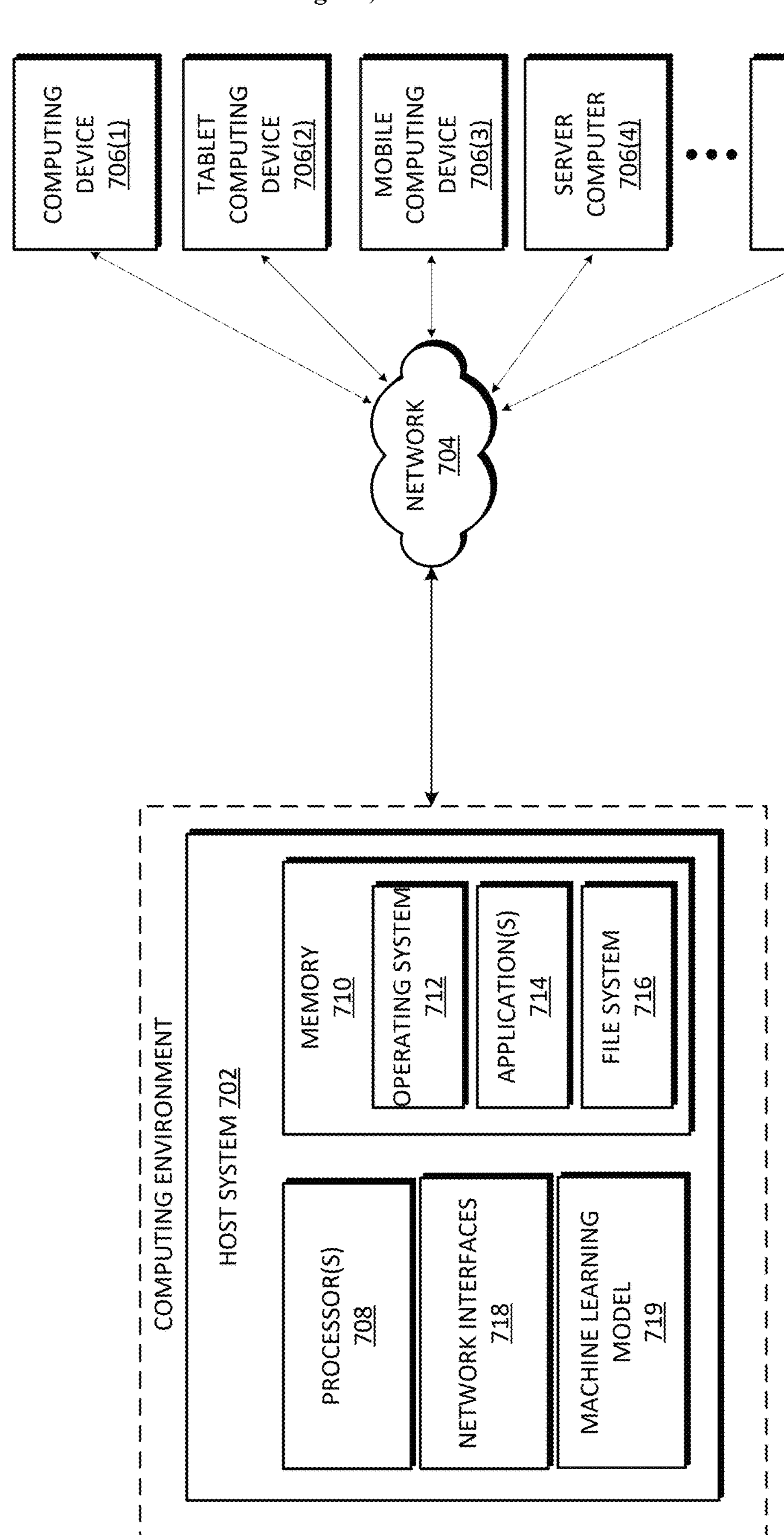
FIG. 7 is a data architecture diagram showing an illustrative example of a computer environment.

FIG. 7 illustrates an example computing environment capable of executing the techniques and processes described above with respect to FIGS. 1-6. In various examples, the computing environment comprises a host system 702. In various examples, the host system 702 operates on, in communication with, or as part of a network 704.

The network 704 can be or can include various access networks. For example, one or more client devices 706(1) . . . 706(N) can communicate with the host system 702 via the network 704 and/or other connections. The host system 702 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 702 can be provided by one or more servers that are executing as part of, or in communication with, the network 704. A server can host various services, virtual machines, portals, and/or other resources. For example, a can host or provide access to one or more portals, Web sites, and/or other information.

The host system 702 can include processor(s) 708 memory 710. The memory 710 can comprise an operating system 712, application(s) 714, and/or a file system 716. Moreover, the memory 710 can comprise the memory 604 described above with respect to FIG. 6.

The processor(s) 708 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 710.

The memory 710 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 702 can communicate over the network 704 via network interfaces 718. The network interfaces 718 can include various types of network hardware and software for supporting communications between two or more devices. The host system 702 may also include machine learning model 719.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses.

Clause 1: A method of identifying conditions in a telecommunications network implemented in a virtualized computing environment, the method comprising:

receiving, by a computing system, data collected from the telecommunications network, wherein the data comprises live data indicative of current conditions in the telecommunications network;

based on the data, accessing, by the computing system, one or more scripts operable to monitor key performance indicators (KPIs) and detect anomalies in the telecommunications network and localizations of the anomalies based on the KPIs, wherein the skills include metadata indicative of the KPIs;

based on the metadata included in the scripts and the localizations of the anomalies, searching, by the computing system, a data store to identify associated incident reports and a troubleshooting knowledge base related to design and requirements of the telecommunications network or portions thereof;

based on the scripts, identified incident reports, and troubleshooting knowledge base, dynamically generating a prompt for input to a large language model (LLM), wherein the prompt is usable to cause the LLM to identify a condition in the telecommunications network at a multi-level hierarchy and identify which functions or applications are affected by the condition, the condition being related to content of the scripts; wherein the condition is localized in the telecommunications network;

inputting the prompt to the LLM; and initiating an action in the telecommunications network based on an output from the LLM.

Clause 2: The method of clause 1, wherein the telecommunications network is a 5G network.

Clause 3: The method of any of clauses 1-2, wherein the scripts are executed on database clusters in the virtualized computing environment.

Clause 4: The method of any of clauses 1-3, wherein the database clusters comprise network traffic logs, telemetry data, and system logs.

Clause 5: The method of any of clauses 1-4, wherein the scripts are configured to execute inline machine learning algorithms to identify anomalies within a queried dataset.

Clause 6: The method of any of clauses 1-5, wherein the scripts contain metadata pertaining to the skill in YAML format.

Clause 7: The method of clauses 1-6, wherein the scripts contain a prompt file and wherein information in the metadata is used to replace placeholders in the prompt file.

Clause 8: A computing system, comprising:

one or more processors; and a computer-readable storage medium having computer-executable instructions stored thereupon which, when executed by the processor, cause the computing system to perform operations comprising:

receiving data collected from a telecommunications network, wherein the data comprises live data indicative of current conditions in the telecommunications network;

based on the data, accessing one or more skills configured to monitor key performance indicators (KPIs) and detect anomalies in the telecommunications network and localizations of the anomalies based on the KPIs, wherein the skills include metadata indicative of the KPIs;

based on the metadata included in the scripts and the localizations of the anomalies, searching, by the computing system, a data store to identify associated incident reports and a troubleshooting knowledge base related to design and requirements of the telecommunications network or portions thereof;

based on the skills, identified incident reports, and troubleshooting knowledge base, dynamically generating a prompt for input to a large language model (LLM), wherein the prompt is usable to cause the LLM to identify a condition in the telecommunications network at a multi-level hierarchy and identify which functions or applications are affected by the condition, the condition being related to the skills; wherein the condition is localized in the telecommunications network;

inputting the prompt to the LLM; and initiating an action in the telecommunications network based on an output from the LLM.

Clause 9: The computing system of clause 8, wherein the skills comprise one or more Kusto Query Language (KQL) scripts.

Clause 10: The computing system of any of clauses 8 and 9, wherein the KQL scripts are executed on database clusters in a virtualized computing environment implementing the telecommunications network.

Clause 11: The method of any of clauses 8-10, wherein the database clusters comprise network traffic logs, telemetry data, and system logs.

Clause 12: The method of any of clauses 8-11, wherein the KQL scripts are configured to execute inline machine learning algorithms to identify anomalies within a queried dataset.

Clause 13: The method of any of clauses 8-12, wherein the skills contain metadata pertaining to the skill in YAML format.

Clause 14: The method of any of clauses 8-13, wherein the skills contain a prompt file and wherein information in the metadata is used to replace placeholders in the prompt file.

Clause 15: A computer-readable storage medium having computer-executable instructions stored thereupon which, when executed by a processor of a computing system, cause the computing system to perform operations comprising:

receiving data collected from a telecommunications network, wherein the data comprises live data indicative of current conditions in the telecommunications network;

based on the data, accessing one or more skills configured to monitor key performance indicators (KPIs) and detect anomalies in the telecommunications network and localizations of the anomalies based on the KPIs, wherein the skills include metadata indicative of the KPIs;

based on the metadata included in the scripts and the localizations of the anomalies, searching, by the computing system, a data store to identify associated incident reports and a troubleshooting knowledge base related to design and requirements of the telecommunications network or portions thereof;

based on the skills, identified incident reports, and troubleshooting knowledge base, dynamically generating a prompt for input to a large language model (LLM), wherein the prompt is usable to cause the LLM to identify a condition in the telecommunications network at a multi-level hierarchy and identify which functions or applications are affected by the condition, the condition being related to the skills; wherein the condition is localized in the telecommunications network;

inputting the prompt to the LLM; and initiating an action in the telecommunications network based on an output from the LLM.

Clause 16: The computer-readable storage medium of clause 15, wherein the skills comprise one or more scripts using a query language.

Clause 17: The computer-readable storage medium of any of clauses 15 and 16, wherein the scripts are executed on database clusters in a virtualized computing environment implementing the telecommunications network.

Clause 18: The computer-readable storage medium of any of clauses 15-17, wherein the database clusters comprise network traffic logs, telemetry data, and system logs.

Clause 19: The computer-readable storage medium of any of clauses 15-18, wherein the scripts are configured to execute inline machine learning algorithms to identify anomalies within a queried dataset.

Clause 20: The computer-readable storage medium of any of the clauses 15-19, wherein the skills contain a prompt file and wherein information in the metadata is used to replace placeholders in the prompt file.

The invention claimed is:

1. A method of identifying conditions in a telecommunications network implemented in a virtualized computing environment, the method comprising:

receiving, by a computing system, data collected from the telecommunications network, wherein the data comprises live data indicative of current conditions in the telecommunications network;

based on the data, accessing, by the computing system, one or more scripts operable to monitor key performance indicators (KPIs) and detect anomalies in the telecommunications network and localizations of the anomalies based on the KPIs, wherein the scripts include metadata indicative of the KPIs;

based on the metadata included in the scripts and the localizations of the anomalies, searching, by the computing system, a data store to identify associated incident reports and a troubleshooting knowledge base related to design and requirements of the telecommunications network or portions thereof;

based on the scripts, identified incident reports, and troubleshooting knowledge base, dynamically generating a prompt for input to a large language model (LLM), wherein the prompt is usable to cause the LLM to identify a condition in the telecommunications network at a multi-level hierarchy and identify which functions or applications are affected by the condition, the condition being related to content of the scripts; wherein the condition is localized in the telecommunications network;

inputting the prompt to the LLM; and initiating an action in the telecommunications network based on an output from the LLM.

2. The method of claim 1, wherein the telecommunications network is a 5G network.

3. The method of claim 2, wherein the scripts are executed on database clusters in the virtualized computing environment.

4. The method of claim 3, wherein the database clusters comprise network traffic logs, telemetry data, and system logs.

5. The method of claim 2, wherein the scripts are configured to execute inline machine learning algorithms to identify anomalies within a queried dataset.

6. The method of claim 2, wherein the scripts contain metadata in YAML Ain't Markup Language (YAML) format.

7. The method of claim 2, wherein the scripts contain a prompt file and wherein information in the metadata is used to replace placeholders in the prompt file.

8. A computing system, comprising:

one or more processors; and a computer-readable storage medium having computer-executable instructions stored thereupon which, when executed by the processor, cause the computing system to perform operations comprising:

receiving data collected from a telecommunications network, wherein the data comprises live data indicative of current conditions in the telecommunications network;

based on the data, accessing one or more skills configured to monitor key performance indicators (KPIs) and detect anomalies in the telecommunications network and localizations of the anomalies based on the KPIs, wherein the skills include metadata indicative of the KPIs;

based on the metadata included in the skills and the localizations of the anomalies, searching, by the computing system, a data store to identify associated incident reports and a troubleshooting knowledge base related to design and requirements of the telecommunications network or portions thereof;

based on the skills, identified incident reports, and troubleshooting knowledge base, dynamically generating a prompt for input to a large language model (LLM), wherein the prompt is usable to cause the LLM to identify a condition in the telecommunications network at a multi-level hierarchy and identify which functions or applications are affected by the condition, the condition being related to the skills; wherein the condition is localized in the telecommunications network;

inputting the prompt to the LLM; and initiating an action in the telecommunications network based on an output from the LLM.

9. The computing system of claim 8, wherein the skills comprise one or more Kusto Query Language (KQL) scripts.

10. The computing system of claim 9, wherein the KQL scripts are executed on database clusters in a virtualized computing environment implementing the telecommunications network.

11. The computing system of claim 10, wherein the database clusters comprise network traffic logs, telemetry data, and system logs.

12. The computing system of claim 9, wherein the KQL scripts are configured to execute inline machine learning algorithms to identify anomalies within a queried dataset.

13. The computing system of claim 8, wherein the skills contain metadata pertaining to the skill in YAML Ain't Markup Language (YAML) format.

14. The computing system of claim 8, wherein the skills contain a prompt file and wherein information in the metadata is used to replace placeholders in the prompt file.

15. A non-transitory computer-readable storage medium having computer-executable instructions stored thereupon which, when executed by a processor of a computing system, cause the computing system to perform operations comprising:

receiving data collected from a telecommunications network, wherein the data comprises live data indicative of current conditions in the telecommunications network;

based on the data, accessing one or more skills configured to monitor key performance indicators (KPIs) and detect anomalies in the telecommunications network and localizations of the anomalies based on the KPIs, wherein the skills include metadata indicative of the KPIs;

based on the metadata included in the skills and the localizations of the anomalies, searching, by the computing system, a data store to identify associated incident reports and a troubleshooting knowledge base related to design and requirements of the telecommunications network or portions thereof;

based on the skills, identified incident reports, and troubleshooting knowledge base, dynamically generating a prompt for input to a large language model (LLM), wherein the prompt is usable to cause the LLM to identify a condition in the telecommunications network at a multi-level hierarchy and identify which functions or applications are affected by the condition, the condition being related to the skills; wherein the condition is localized in the telecommunications network;

inputting the prompt to the LLM; and initiating an action in the telecommunications network based on an output from the LLM.

16. The non-transitory computer-readable storage medium of claim 15, wherein the skills comprise one or more scripts using a query language.

17. The non-transitory computer-readable storage medium of claim 16, wherein the scripts are executed on database clusters in a virtualized computing environment implementing the telecommunications network.

18. The non-transitory computer-readable storage medium of claim 17, wherein the database clusters comprise network traffic logs, telemetry data, and system logs.

19. The non-transitory computer-readable storage medium of claim 16, wherein the scripts are configured to execute inline machine learning algorithms to identify anomalies within a queried dataset.

20. The non-transitory computer-readable storage medium of claim 15, wherein the skills contain a prompt file and wherein information in the metadata is used to replace placeholders in the prompt file.

* * * * *